April 14, 1970        M. EISENBERG        3,506,493

ELECTROCHEMICAL CELL HAVING BARRIER WITH MICROPOROUS OPENINGS

Filed Aug. 5, 1964

INVENTOR.
MORRIS EISENBERG

BY Townsend and Townsend

ATTORNEYS

United States Patent Office 3,506,493
Patented Apr. 14, 1970

3,506,493
ELECTROCHEMICAL CELL HAVING BARRIER WITH MICROPOROUS OPENINGS
Morris Eisenberg, Palo Alto, Calif., assignor to Electrochimica Corporation, Menlo Park, Calif.
Filed Aug. 5, 1964, Ser. No. 387,602
Int. Cl. H01m 27/02, 27/06, 27/12
U.S. Cl. 136—86                                    8 Claims

ABSTRACT OF THE DISCLOSURE

An electrochemical cell having an improved matrix barrier for interposition between the electrodes of the cell, particularly those of the type known as fuel cells, wherein such barrier includes at least one relatively dense layer having microporous openings in the size range of .25 to 30 microns disposed between layers of bibulous material carrying an appropriate electrolyte and further confined at the outer faces thereof by the anode and cathode structures of said electrodes. The dense barrier having microporous openings in the size range of .25 to 30 microns maintains the two electrodes in conducting condition but blocks trans-migration of the greater portion of non-ionic reactants or products of reaction while at the same time permitting the passage of ions through such dense barrier from one electrode to the other without reliance upon ion-exchange mechanisms and affording a relatively low internal cell resistance.

---

Figure 1:
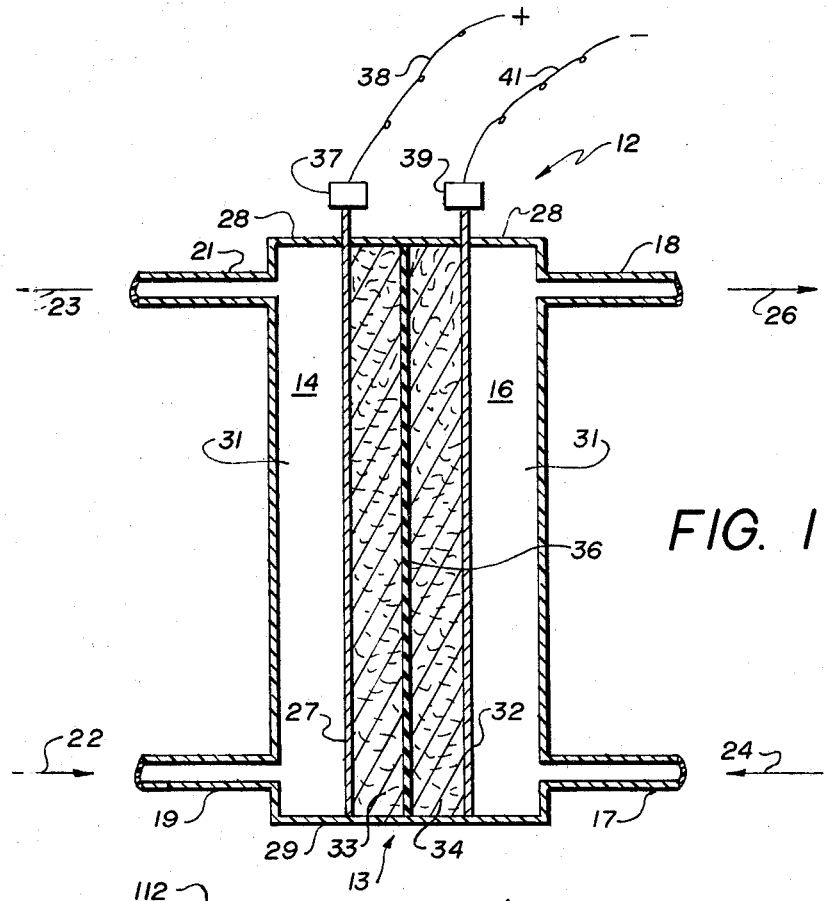

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to improvements in electrochemical cells, such as fuel cells, electrolytic decomposition cells and the like.

The electrochemical cells commonly incorporate a pair of spaced apart conductive electrode plates in which an electrolyte is disposed between the two. Fluid in the form of either gas or liquid is applied or evolved at the outer walls of the two electrodes wherein there is an electrochemical reaction between the fluids engaged with the opposite electrodes through the electrolyte.

One of the principal problems encountered in such cells is the transmigration of the reactant or product fluid at one electrode to the opposite electrode through the electrolyte. Such transmigration causes excessive polarization of the contaminated electrode, so that the electrical output of the cell or the reaction yield of the cell is reduced. This is particularly true in the case of non-ionic molecular fluids, such as oxygen, hydrogen, hydrazine and the like.

One of the means employed in electrochemical cells for preventing such transmigration of non-ionic species is in the employment of a bibulous filler between the two electrodes. The bibulous material is formed of material such as asbestos fibers which are inert to the electrolyte and the electrode products or reactants. This technique has exhibited good results in reducing the transmigration of the non-ionic species between the electrodes. However, even in the best employment of this technique the transmigration can be reduced only to result in a level of contamination in the order of 2 to 3 percent. In many applications it is desirable and even necessary to have the transmigration lowered much beyond this level.

It is the object of the present invention to provide a structure having an improved barrier against molecular transmigration in the aforesaid type of electrochemical cells which will block transmigration of molecules substantially above that otherwise obtainable in the prior art without impairing the passage of ions between electrodes.

Another object of this invention is to provide an electrochemical cell filler in which bibulous material which entrains an electrolyte is separated into two compartments by a barrier wall, the barrier wall being formed of a material which, like the bibulous material, is inert to the electrolyte and the electrode materials, but which is also characterized by having microporous apertures which allow ionic migration, but block diffusion of the non-ionic species of the electrode reactants or products.

It is a further object of the invention to provide an electrochemical cell in which the cross-diffusion of reactants or products is maintained in the order of .2 percent or less by volume content.

Another object of this invention is to provide a matrix for electrochemical cells utilizing bibulous means for entraining the cell's electrolyte mounted in contact with the surfaces of the electrodes in which a dense barrier having microporous openings in the size range of .25 to 30 microns is employed within the bibulous material to further separate the two electrodes. The provision of the barrier maintains the two electrodes in conducting condition but blocks transmigration of the greater portion of non-ionic reactants or products of reaction.

Another feature and advantage of this invention is that by the use of discrete layers of bibulous material entraining the electrolyte and separated by thin, dense ion permeable barriers transmigration ions is permitted but substantially blocks the passage of molecules to provide an extremely compact galvanic or electrolytic decomposition cell structure.

Another object of this invention is to provide a composite matrix for an electrolytic decomposition cell particularly adapted for the use of hydrazine liquid and oxygen gas at the electrodes.

Figure 2:
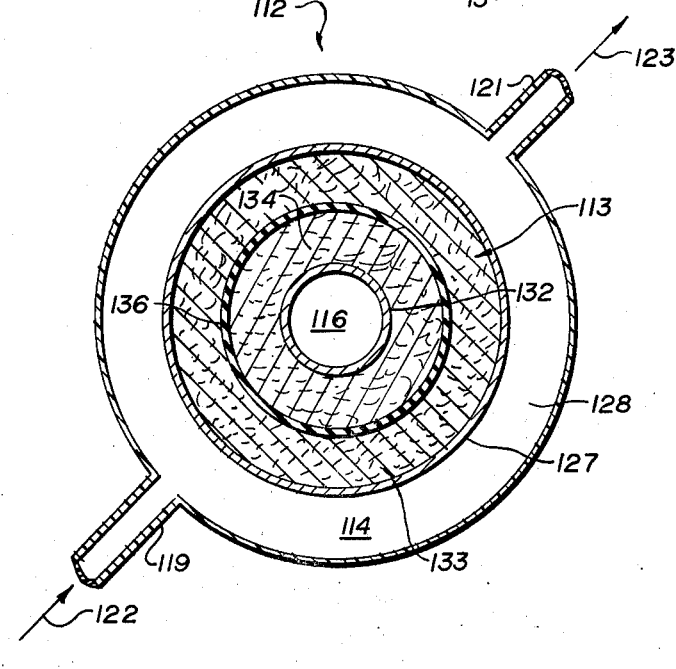

Turning now to the drawings:
FIGURE 1 is a schematic cross sectional side elevational view of a rectangular electrochemical cell utilizing my invention.
FIGURE 2 is a schematic cross sectional plan view of a cylindrical electrochemical cell utilizing my invention.

This invention embodies structure which includes a matrix for novel use in electrochemical cells including those of the reaction, galvanic and fuel cell type. The matrix comprises at least three components which may be combined in a variety of configurations and includes at least two bibulous electrolyte absorbent layers having a microporous membrane or dense barrier therebetween capable of preventing transmigration of molecules while permitting the passage therethrough of ionic particles. The faces of at least two of the bibulous absorbent layers, which are not in contact with a microporous layer, are in physical contact with the cell electrodes. Further, the bibulous absorbent layers entrain electrolyte material and maintain such material in contact with the electrodes and the dense barrier disposed between the bibulous layers.

My invention is best understood by referring first to the accompanying FIGURE 1 which illustrates the application of my matrix to a typical fuel cell employing oxygen at the cathode and hydrogen at the anode. A cell casing is indicated generally at 12 housing therein the matrix indicated at 13 which separates internal gas chambers 14 and 16. Chamber 16 is provided with gas inlet port 17 and exit port 18; chamber 14 is similarly provided with inlet port 19 and exit port 21. In the example shown, oxygen is introduced into chamber 14 in a direction indicated by arrow 22 and passed therefrom in the direction indicated by arrow 23. Suitable circulation of the gas under proper pressure is achieved utilizing known expedients in the art not shown on the drawings nor described in further detail herein. Hydrogen gas is introduced into chamber 16 in the direction indicated by arrow 24 and passed therefrom in a direction indicated by arrow 26; a suitable source and pressure regulating means similar to that used at the cathode is provided.

Porous cathode plate 27 defines one entire side of chamber 14 extending between casing top surface 28, bottom surface 29, wall 31, and an opposite wall which does not appear in the sectional view of FIGURE 1. The porous cathode plate may be fabricated of any material inert to the particular fuel cell reactive components and for a hydrogen-oxygen fuel cell may take the form of a catalyzed porous nickel plate. Hydrogen electrode 31, the anode of the fuel cell shown in FIGURE 1, is provided at the oppoiste side of the cell and forms one entire wall of chamber 16. The anode in the case of a hydrogen-oxygen fuel cell also may be formed from catalyzed porous nickel plate, but other porous or gas diffusing metals or non-metals may be used. For example, the hydrogen electrode may be fabricated of a sheet of palladium silver alloy which has the characteristic ability in solid sheet form to diffuse hydrogen therethrough.

Disposed between electrodes 27 and 31 is the matrix generally indicated at 13 which comprises two distinct absorbent bibulous layers 33 and 34 separated by microporous diaphragm 36. In the construction of the cell shown in FIGURE 1, the entire matrix sandwich indicated at 13 is co-extensive with the space defined by the inner surfaces of casing top 28, bottom 29, wall 31 and the wall opposite to the latter which does not appear in the sectional view of FIGURE 1. In the construction of this I have found it satisfactory to make bibulous layers 33 and 34 each comprise a layer of white asbestos approximately .010 inch thick initially impregnated with a 30 percent solution of potassium hydroxide. The bibulous material herein, as in all the matrices to which my invention applies, is preferably of a highly absorbent character and thus involve highly porous material, material that has a far greater porosity than dense diaphragm 36 referred to herein. The microporous dense diaphragm 36 shown therebetween also may be saturated with the same electrolyte solution before installation and comprises a sheet of polyethylene having a pore size diameter of approximately 1.5 microns which has been found satisfactory in this application (in other applications, I have found that my matrix requires a membrane or diaphragm comprised of material characterized by having inherent porosity with a pore size range of about .25 to about 30 microns. Such material includes the group comprising microporous rubber, polyolefin, polyvinyl chloride, and fluorinated polymer plastics).

On completion of the construction of the cell in accordance with the schematic layout of FIGURE 1, and after connecting the cell to a suitable electric circuit briefly described below, oxygen and hydrogen gas may be introduced to chambers 14 and 16, respectively. As such operation commences, oxygen molecules are reduced to hydroxyl ions at the interface of porous electrode 27 and bibulous layer 33; and hydrogen molecules are oxidized to ions at the interface of anode 32 and bibulous layer 34. The electrical circuitry is completed by the connection of cathode 37 through lead wire 38, and anode 39 through lead wire 41, to an external load not shown on the drawings nor described herein which causes the passage of electrons into the cell at the cathode and from the cell at the anode.

As the cell described above continues in operation, a certain quantity of gaseous molecules originating from both hydrogen chamber 16 and oxygen chamber 14 will normally tend to diffuse in non-ionic molecular form from the surfaces of the anode and cathode, respectively, toward the electrodes on the opposite sides of the cell. Such transmigration however is blocked by the presence of dense barrier means 36 whose pore openings are in the order of one and one-half microns. The unexpected result here is that even though the microporous openings of the dense barrier are not less than the effective molecular diameter of the hydrogen and oxygen molecules of the fuel cell as shown herein, nevertheless only a very scant amount of these gases tends to permeate such a membrena. Part of the phenomena referred to here may be explained on the basis of pore density and distribution and the pressure differentials under which the gases must be maintained in order to operate the cell, but still further physical chemical theories appear necessary to fully explain these results. Suffice it to say, for purposes of my invention, the effect of the microporous membrane is to reduce significantly the transmigration of gaseous molecules in the application herein described.

Although molecular transmigration is substantially prevented by microporous dense diaphragm 36, the transport of ions, i.e. hydrogen ions from anode 32 and oxygen or hydroxyl ions from cathode 27, is not significantly impeded by the membrane's presence. In fact, the internal cell resistance between cathode 27 and anode 32 is as low as in most fuel cells of this general type and character. It is to be noted in this connection that saturated bibulous layers 33 and 34 maintain essential wetting of electrodes 27 and 32 so that proper ionization of the gases may occur at their surfaces. The bibulous layers also maintain membrane 36 wet and therefor in a conductive condition for the passage of ions therethrough.

Although the above fuel cell has been described with particular components, it is understood that the same general arrangement as shown in the schematic cross section of FIGURE 1 may be applied using the gases indicated therein but with other suitable electrolytes. Moreover, the oxidizing gas may be other than oxygen, for example, oxygen mixed with other gases or air; or other organic or inorganic gaseous oxidants when the gas introduced at the anodic chamber 16 is a reducible gaseous fuel which is capable of anodic oxidation in a fuel cell.

FIGURE 2 shows schematically an alternative embodiment of the same fuel cell as indicated in FIGURE 1 wherein the basic configuration is cylindrical rather than rectangular. In the alternate embodiment, a non-conductive cell casing indicated generally at 112 completely surrounds the matrix indicated generally at 113 to form an outer gas chamber 114 and an inner chamber 116. Chamber 116 is provided with a communicating port at its bottommost portion and a gas outlet at its uppermost portion, neither of which appear in the schematic cross section of FIGURE 2. Chamber 114 is provided with inlet port 119 and gas outlet port 120. In a manner similar to the hydrogen-oxygen fuel cell described above in respect to FIGURE 1, oxygen may be introduced into chamber 114 in the direction of arrow 122 and pass therefrom in the direction of arrow 123; hydrogen gas may be introduced through the inlet port at the bottom of chamber 116 and passed therefrom through an outlet port at the top of 116, said inlet and outlet ports not appearing in the cross sectional view of FIGURE 2. A cylindrical catalyzed porous nickel electrode 127 is provided within and concentric to the housing being co-extensive between the inner surfaces of bottom 128 and the top thereof which does not appear in the sectional view of FIGURE 2. Similarly a smaller cylindrical and concentric electrode 132 also made of catalyzed porous nickel is provided to define innermost chamber 116 and is also co-extensive between the top and bottom of the casing indicated at 112. Bibulous absorbent asbestos layers 133 and 134 with microporous dense barrier 136 formed in a concentric cylindrical shape therebetween comprise the matrix indicated generally at 113. Again, similar to the hydrogen-oxygen fuel cell described in respect to FIGURE 1 above, bibulous layers 133 and 134 are saturated with a 30 percent solution of potassium hydroxide at the time of installation while dense barrier means 136 also may be saturated with the electrolyte before its placement within the casing indicated generally at 112. Operation of the cell described herein is similar to that described above with respect to FIGURE 1.

It should be noted that although I have shown only two layers of bibulous material interspersed with a single dense barrier diaphragm, a plurality of such bibulous layers and microporous dense diaphragms of the type indicated at 36 could be interposed between the porous or discontinuous electrodes 27 and 32 in FIGURE 1 or 127 and 132 of FIGURE 2. Given a constant rectangular cell cross section or cylindrical cell height, the effect of such additional electrolytic materials or matrices should measurably increase the expected operational life of the device.

Moreover, although I have shown an example of a gaseous fuel cell in FIGURES 1 and 2 with a fixed amount of electrolyte material provided in the bibulous layers 33 and 34, the life of such a cell may be increased by providing for reconcentration of the electrolyte diluted by the generation of water within the cell during operation. Means for such reconcentration of electrolyte are known in the art and not shown in the drawings nor further described herein although it is understood that such means may be added to my invention with relatively minor modifications and additions.

Although the above described in respect to FIGURES 1 and 2 has been in terms of a fuel cell utilizing hydrogen and oxygen in a potassium hydroxide electrolyte, I wish to refer now again to FIGURE 1 and indicate the adaptation of that cell to the use of a gaseous electrode in combination with a liquid circulated at the anode. Such a modification may be made with relatively minor changes in the apparatus that I have described earlier with reference to FIGURE 1. The cathode side of the cell may be left substantially as shown therein with other changes as indicated henceforth. In lieu of the introduction of hydrogen gas through inlet port 17 to chamber 16 in the direction of arrow 24, there may be substituted a liquid solution comprising a 30 percent solution of KOH containing .2 of mole per liter concentration of hydrazine. The anodic oxidation of hydrazine at the anode results in the formation of nitrogen gas and of hydrogen ions which then migrate through the bibulous layers 34 and membrane 36 to combine with hydroxyl ions from the cathode to form water molecules in the manner similar to that described above for the hydrogen-oxygen fuel cells. The nitrogen by-products exit with the circulating electrolyte. The hydrazine and potassium hydroxide solution is maintained through chambers 16 by means of a known replenishing supply and pump not shown in the drawings nor further described herein. Means may also be provided to maintain a relatively constant concentration of hydrazine and potassium hydroxide so that the cell may be operated continually at nearly equilibrium conditions. Hydrazine in molecular form is prevented from migrating to the oxygen side where polarization of the oxygen electrode might occur by the action of microporous membrane 36. Similarly oxygen gas is inhibited from migrating to the anode side to deteriorate the anode performance.

The foregoing description has been directed generally to galvanic type cells of the fuel cell type and those employing either two gaseous electrodes or one gaseous electrode and one liquid electrode. It should be noted that other types of galvanic cells may employ the matrix of my invention as described above wherein transmigration of non-ionic molecular species to cause undesirable polarization of opposite electrodes may be minimized if not substantially eliminated.

In addition my invention may also be employed in electrochemical cells of the decomposition type. Again with reference to FIG. 1 the following description of an electrochemical decomposition cell may be applied thereto. For example, a suitable solution of sodium chloride may be introduced on both sides of diaphragm 36 and circulated through the bibulous material layers 33 and 34. Such introduction and circulation may be achieved by providing fluid communication means to both sides of membrane 36 and within that portion of the cell defined by electrodes 27 and 32. As a solution of sodium chloride is circulated through the bibulous layers 33 and 34, an outside source of electrical energy of indicated polarity may be impressed upon cathode 37 and anode 39. As the electrons flow from the interface of layer 33 and electrode 27 through the external source of energy and back through anode 39 to the interface of electrode 32 and through bibulous layer 34, chlorine ions present in bibulous layer 33 surrender their excess electrons and form molecules of chlorine gas which may be pumped away from chamber 14 in the direction of arrow 23 through outlet region 21. When the cell is modified for adaptation to this type of operation of electrolytic decomposition, inlet port 19 is closed off. At the same time sodium ions present within bibulous layers 34 acquire needed electrons to neutralize the ionic charge thereon and form free sodium molecules. Due to the high reduction potential of free sodium metal, sodium molecules thus formed are preferably entrained at electrode 32 by forming an amalgam therewith. One method for doing this known in the art is to employ a mercury electrode at 32, preferably of the recirculating type, and wherein the sodium-mercury amalgam may be carried away from the interface of bibulous layer 34 for further processing and recovery of the sodium and return of the reconstituted mercury for further use at the electrode. In such a modification of my cell, it is preferable to form chamber 16 to a suitable dimension and circulate liquid mercury through port 17 on the direction of arrow 24 and remove the amalgam through port 18 in the direction of arrow 26. Transmigration of molecules from the amalgamating electrode and molecules formed by the ionic activity at both electrodes is prevented by microporous membrane 36.

It may be noted here that other forms of electrolytic decomposition may employ the application of my invention. Although NaCl decomposition is of common industrial application in the art of inorganic chemistry, numerous other applications will be apparent to one of ordinary skill in the art in the fields of both organic and inorganic electrochemistry.

Although I have described my invention about with respect to particular applications in the field of fuel cells and electrolytic decomposition cells, this has been done by way of example for clarity of explanation. It is understood that numerous applications may be made using other and different electrode products and reactants in various combinations with a number of electrolytes. The character of electrochemical cells to which my invention is particularly adapted are those having non-ionic molecular species as electrode reactants or products, and it is highly desirable to prevent such species from transmigrating to electrodes at the opposite sides of the cell. Moreover, my invention may be embodied in a number of types of cells, a few of which have been indicated in the foregoing specification, within the spirit of my invention and scope of the appended claims.

In the claims:

1. In an electrochemical cell of the type having two fluid porous chambers separated by an electrolyte in which one of said chambers is gas porous towards the electrolyte and the other said chamber is liquid porous towards the electrolyte, for oxidation of the gas introduced into one chamber and reduction of the liquid introduced into the other chamber, the combination of a thin barrier in the electrolyte area separating the two chambers from each other, said barrier formed of a membrane with microporous openings in the size range of .25 to 30 microns and of a material inert to the electrolyte and the gas and liquid to be employed in conjunction with said chambers, a bibulous electrolyte entrained filler disposed in the region between said barrier and said chambers, said filler being in conductive contact with said chambers and said barrier, whereby said filler and barrier block transmigration of the gas and liquid introduced into said chambers and allow ion passage between chambers.

2. In an electrochemical cell of the type having two gas chambers separated by an electrolyte in which each of said chambers is gas porous towards the electrolyte, the combination of: a thin barrier in the electrolyte region separating the two chambers from each other, said barrier being formed of a membrane with microporous openings between .25 and 30 microns in size and formed of a material inert to the electrolyte and the gas to be employed in conjunction with said chamber, a bibulous electrolyte entrained filler disposed in the region between said barrier and said chambers, said filler being in conductive contact with said chambers and barriers, whereby said filler and barrier block transmigration of gas and allow ion passage between chambers.

3. In an electrochemical cell of the type defined in claim 2 and wherein said barrier is comprised of material selected from the group consisting of: microporous rubber, polyolefins, (polyvinyl chloride) and fluorinated polymer plastics.

4. In an electrochemical cell of the type defined in claim 2 and wherein said filler is comprised of material selected from the group consisting of: asbestos, non-woven cotton, non-woven polyolefins, nylon, (polyvinyl chloride), cellophane, non-woven glass, paper, cellulose and regenerated cellulose.

5. An electrochemical cell, comprising two spaced apart electrode bodies, means to engage each of said bodies with non-ionic molecular fluids, said body formed to meter said fluids to the space between said bodies, a pack of bibulous material disposed in the area between said bodies, said material selected from the group consisting of: asbestos, non-woven polyolefins, nylon, polyvinyl chloride, cellophane, non-woven glass, paper, cellulose and regenerated cellulose; a microporous diaphragm disposed within the bibulous material and separating said two bodies, said microporous diaphragm being of the type having microporous openings in the (a pore) size range of .25 to 30 microns and comprised of material selected form the group consisting of: microporous rubber, polyolefins, polyvinyl chloride and fluorinated polymer plastics; and an electrolyte entrained within said bibulous material.

6. In an electrolytic decomposition cell of the type having at least two separated electrodes with an electrolyte therebetween for the conduction of electric current from an external source, said cell having at least one of said electrodes in contact with a gaseous product of decomposition, the combination comprising: bibulous means mounted in contact with the surface of each electrode to hold the electrolyte and maintain contact of the electrolyte with the surfaces of each said electrodes; and barrier means disposed between said bibulous means in contact with the electrolyte to block transmigration of the products of decomposition and pass ions between said electrodes through said barrier means, said barrier means comprising a microporous membrane chemically inert to the electrolyte and products of decomposition of said electrochemical cell and having openings therethrough whose diameters are in the range of not less than about .25 microns to not more than about 30 microns.

7. An electrolytic decomposition cell in accordance with claim 6 and wherein said microporous membrane is comprised of material selected from the group consisting of: microporous rubber, polyolefins, polyvinyl chloride and fluorinated polymer plastics.

8. A fuel cell for generating electrical energy in which the opposite electrode fuels are of the type which may combine spontaneously with each other, such as hydrazine liquid being oxidized at one electrode and oxygen gas being the oxidizing gas at the opposite electrode, said fuel cell comprising: an electrolyte chamber containing a bibulous filler entrained with an electrolyte solution, a membrane within said chamber separating the chamber into first and second sections having microporous openings forming communication between said sections, said membrane openings having a diameter range of about .25 to about 10 microns, means to meter an oxidizing gas of the one said electrode into and out of the first of said sections and means to meter the fuel of the opposite electrode into and out of the second of said sections whereby a potential is produced by the electrochemical reaction of the oxidizing gas and the fuel of the opposite electrode.

References Cited

UNITED STATES PATENTS

| | | | |
|---|---|---|---|
| 2,070,612 | 2/1937 | Niederreither | 136—86 |
| 2,729,694 | 1/1956 | Ellis | 136—145 |
| 3,121,031 | 2/1964 | Gruneberg et al. | 136—86 |
| 3,202,547 | 8/1965 | Rightmire et al. | 136—86 |
| 3,216,882 | 11/1965 | Feldt et al. | 136—86 X |
| 3,223,556 | 12/1965 | Cohn et al. | 136—86 |
| 3,242,059 | 3/1966 | Cottam et al. | 204—266 X |

FOREIGN PATENTS 451,391  9/1948  Canada.

ALLEN B. CURTIS, Primary Examiner

U.S. Cl. X.R.

204—265